US008506488B2

(12) United States Patent
Shin et al.

(10) Patent No.: US 8,506,488 B2
(45) Date of Patent: Aug. 13, 2013

(54) ULTRASOUND IMAGE ENHANCEMENT IN AN ULTRASOUND SYSTEM

(75) Inventors: Dong Kuk Shin, Seoul (KR); Jong Ho Joo, Seoul (KR)

(73) Assignee: Medison Co., Ltd., Kangwon-Do (KR)

( * ) Notice: Subject to any disclaimer, the term of this patent is extended or adjusted under 35 U.S.C. 154(b) by 304 days.

(21) Appl. No.: 12/854,710

(22) Filed: Aug. 11, 2010

(65) Prior Publication Data

US 2011/0046486 A1    Feb. 24, 2011

(30) Foreign Application Priority Data

Aug. 18, 2009    (KR) ........................ 10-2009-0076246

(51) Int. Cl.
*A61B 8/00* (2006.01)
(52) U.S. Cl.
USPC .......................................... 600/443; 600/437
(58) Field of Classification Search
USPC ................................................ 600/437, 443
See application file for complete search history.

(56) References Cited

U.S. PATENT DOCUMENTS

| 7,520,855 | B2 * | 4/2009 | Tamano et al. | ............... | 600/437 |
| 2004/0054284 | A1 * | 3/2004 | Cai et al. | ..................... | 600/443 |
| 2008/0077009 | A1 | 3/2008 | Lee et al. | | |

FOREIGN PATENT DOCUMENTS

| KR | 10-2008-0028106 A | 3/2008 |
| KR | 10-2009-0052269 A | 5/2009 |
| WO | 00/34802 A1 | 6/2000 |

OTHER PUBLICATIONS

Korean Office Action issued in Korean Patent Application No. 10-2009-0076246 dated Dec. 23, 2011.
Extended European Search Report issued in European Patent Application No. EP 10171586.0 dated Apr. 25, 2013.
M. Tanter et al., "Ultrafast Compound Imaging for 2-D Motion Vector Estimation: Application to Transient Elastography," IEEE Transactions on Ultrasonics, Ferroelectrics and Frequency Control, vol. 49, No. 10, Oct. 31, 2002, XP011368342.

* cited by examiner

*Primary Examiner* — Michael Rozanski
(74) *Attorney, Agent, or Firm* — McDermott Will & Emery LLP

(57) ABSTRACT

Embodiments for providing enhanced ultrasound images without lowering a frame rate in an ultrasound system are disclosed. In one embodiment, the ultrasound system includes: an ultrasound data acquisition unit configured to transmit ultrasound beams to a target object along predetermined plural scan line groups of scan lines in an alternative and sequential manner, receive ultrasound echoes reflected from the target object, and provide a plurality of ultrasound frame data, said predetermined plural scan line groups being respectively associated with predetermined steering angles and each of the plurality of ultrasound frame data being produced in response to the transmission of the ultrasound beam along the respective scan line groups; and a processor configured to sequentially form ultrasound images based on the ultrasound frame data and compound the ultrasound images in an interleaving way to form compound images.

7 Claims, 6 Drawing Sheets

ULTRASOUND IMAGE ENHANCEMENT IN AN ULTRASOUND SYSTEM

CROSS-REFERENCE TO RELATED APPLICATIONS

The present application claims priority from Korean Patent Application No. 10-2009-0076246 filed on Aug. 18, 2009, the entire subject matter of which is incorporated herein by reference.

TECHNICAL FIELD

The present disclosure generally relates to ultrasound image processing, and more particularly to enhancing ultrasound images without lowering a frame rate in an ultrasound system.

BACKGROUND

An ultrasound system has been extensively used in the medical field due to its non-invasive and non-destructive nature. Modern high-performance ultrasound imaging diagnostic systems and techniques are commonly used to produce two-dimensional or three-dimensional ultrasound images of internal features of patients.

Recently, spatial compounding has been adopted in the ultrasound system to provide enhanced ultrasound images. Spatial compounding is implemented by compounding a predetermined number of ultrasound images (e.g., three ultrasound images), which have been successively formed at different steering angles of scan lines, to form a compound image. However, since spatial compounding must be implemented after forming the predetermined number of ultrasound images, it may result in a reduced frame rate of the compound images.

SUMMARY

Embodiments for enhancing ultrasound images without lowering a frame rate in an ultrasound system are disclosed herein. In one embodiment, by way of non-limiting example, an ultrasound system comprises: an ultrasound data acquisition unit configured to transmit ultrasound beams to a target object along predetermined plural scan line groups of scan lines in an alternative and sequential manner, receive ultrasound echoes reflected from the target object, and provide a plurality of ultrasound frame data, said predetermined plural scan line groups being respectively associated with predetermined steering angles and each of the ultrasound frame data being produced in response to the transmission of the ultrasound beam along the respective scan line groups; and a processor configured to sequentially form ultrasound images based on the ultrasound frame data and compound the ultrasound images in an interleaving way to form compound images.

In another embodiment, a method of providing compound images in an ultrasound system, comprises: a) transmitting ultrasound beams to a target object along predetermined plural scan line groups of scan lines in an alternative and sequential manner, and receiving ultrasound echoes reflected from the target object; b) providing a plurality of ultrasound frame data, said predetermined plural scan line groups being respectively associated with predetermined steering angles and each of the ultrasound frame data being produced in response to the transmission of the ultrasound beam along the respective scan line groups; c) sequentially forming ultrasound images based on the ultrasound frame data; and d) compounding the ultrasound images in an interleaving way to form compound images.

The Summary is provided to introduce a selection of concepts in a simplified form that are further described below in the Detailed Description. This Summary is not intended to identify key or essential features of the claimed subject matter, nor is it intended to be used in determining the scope of the claimed subject matter.

DETAILED DESCRIPTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Figure 1:
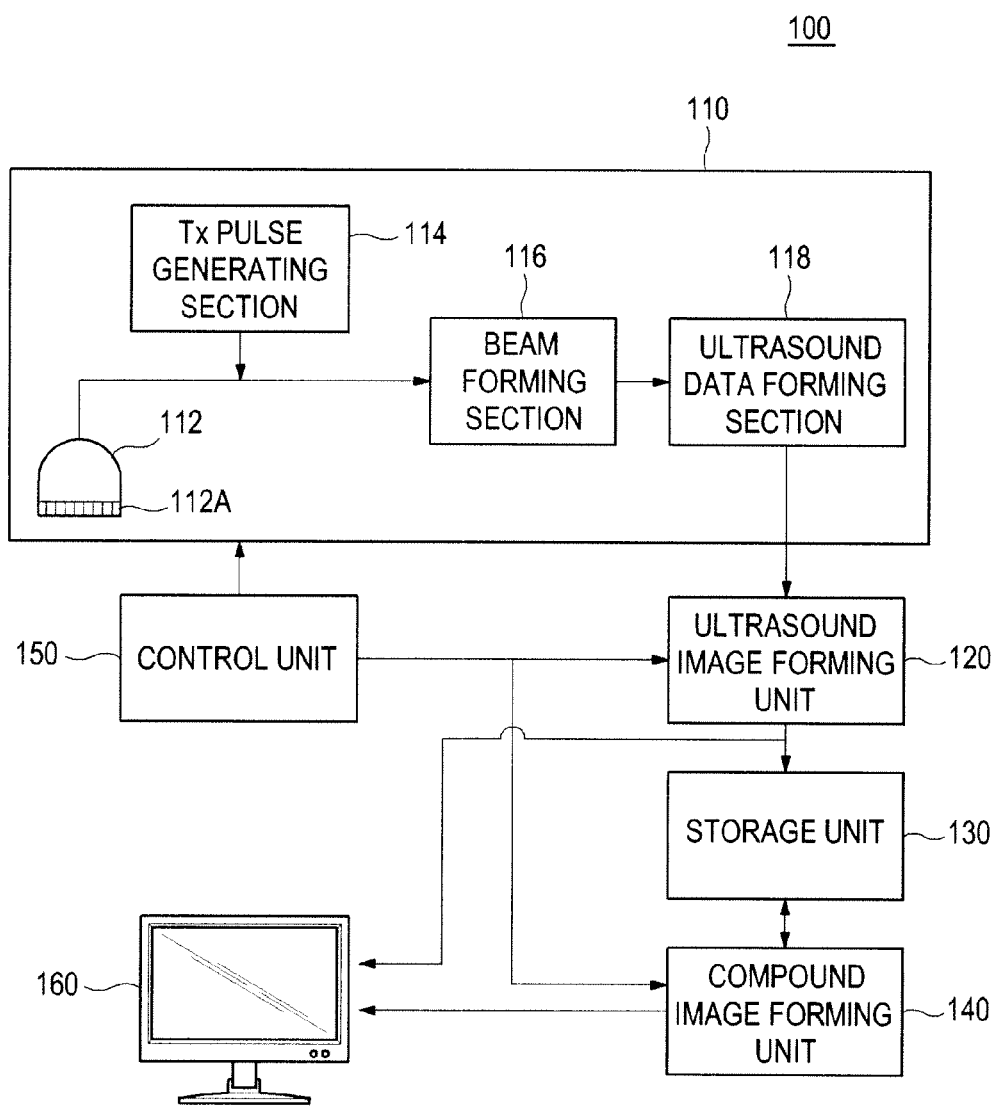
FIG. 1 is a block diagram showing an illustrative embodiment of an ultrasound system.

Referring to FIG. 1, an ultrasound system constructed in accordance with one embodiment is shown. The ultrasound system 100, which embodies methods of the present invention, may include an ultrasound data acquisition unit 110. The ultrasound data acquisition unit 110 may be configured to transmit ultrasound beams to a target object and receive ultrasound echoes reflected from the target object to thereby form ultrasound data representative of the target object.

The ultrasound data acquisition unit 110 may include an ultrasound probe 112 containing an array transducer 112A that may be operable to transmit ultrasound beams along scan lines being aligned with a direction of a scan head of the ultrasound probe 112. The scan lines may be steered at one of the multiple angles relative to a scan head of the ultrasound probe 112. In one embodiment, the ultrasound probe 112 may include any one of a linear probe, a convex probe and the like. The ultrasound beam may be transmitted while applying pressure to the target object. The pressure may be applied using any device capable of uniformly applying the pressure on the target object such as the scan head of the ultrasound probe 112. A plate may be mounted around the scan head of the ultrasound probe 112 to extend an effective pressure area. A stress sensor (not shown) may be provided to sense stress caused by the pressure application. The stress sensor may be installed on any place (e.g., front surface of the plate mounted around the scan head) to sense the stress.

In one embodiment, the transmission of the ultrasound beams may be controlled by a transmission (Tx) pulse generating section 114. The Tx pulse generating section 114 may include a plurality of pulsers to generate Tx pulses, which are delivered to the elements of the array transducer for actuation thereof. The Tx pulse generating section 114 may be further operable to apply delays to the Tx pulses to form a Tx pattern, by which the phasing and time of the actuation of the elements of the array transducer may be controlled. In this way, the ultrasound beam may be transmitted at a predetermined steering angle.

Figure 2A:
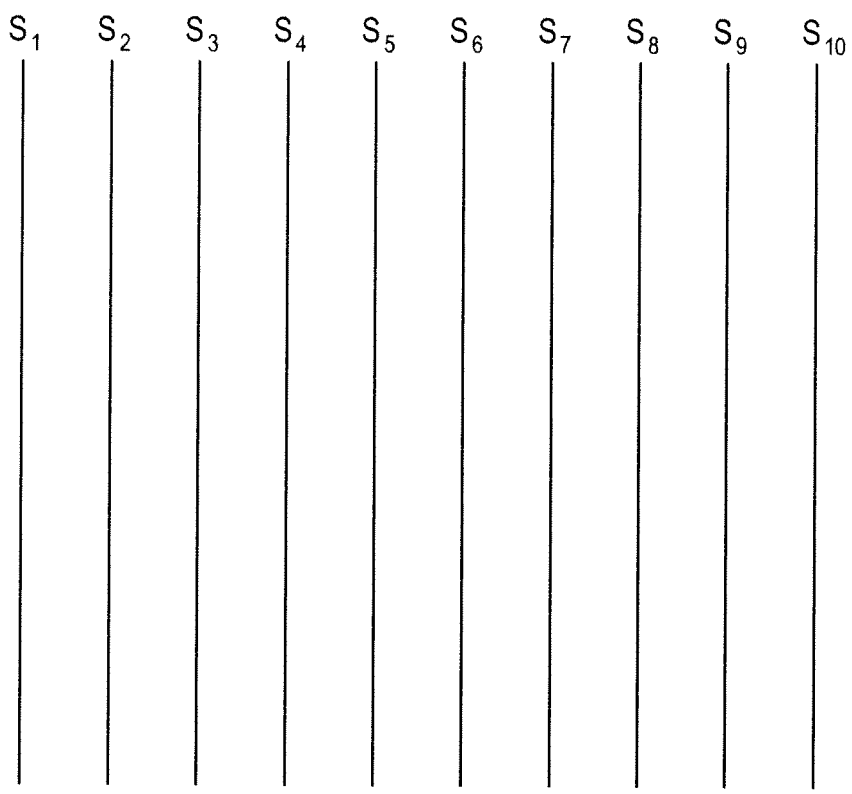
FIG. 2A is a schematic diagram showing a scan line group with its scan lines not steered.
Figure 2B:
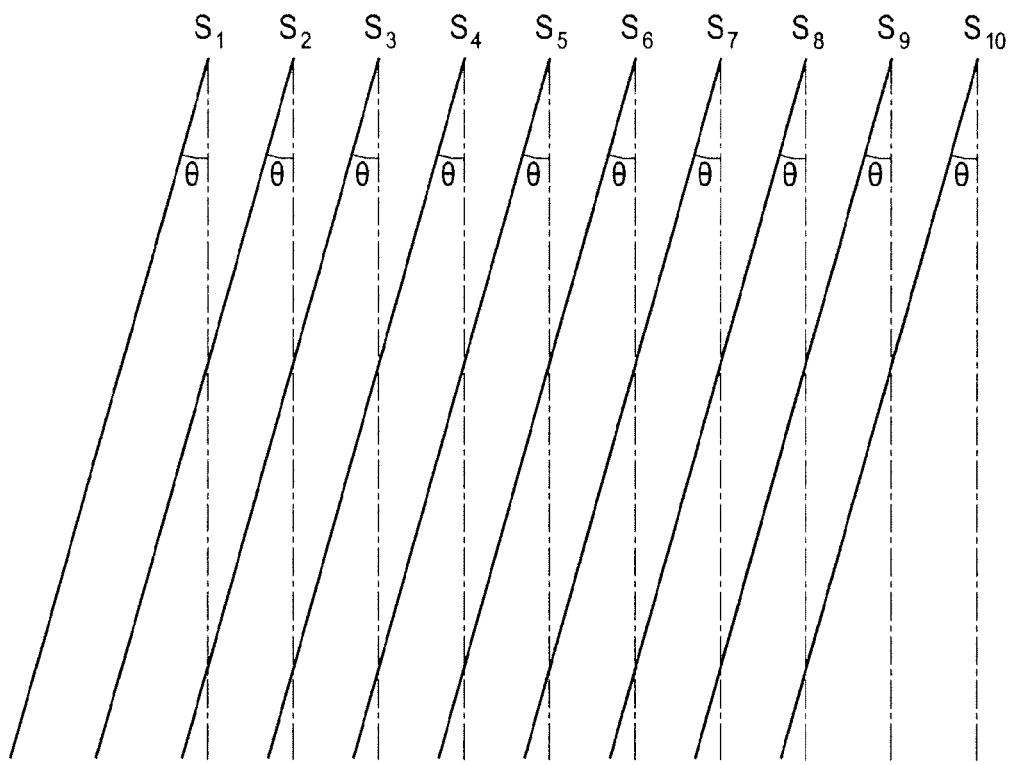
FIG. 2B is a schematic diagram showing a scan line group with its scan lines being steered at a predetermined steering angle ($\theta$) with respect to a direction of a scan head of an ultrasound probe.
Figure 2C:
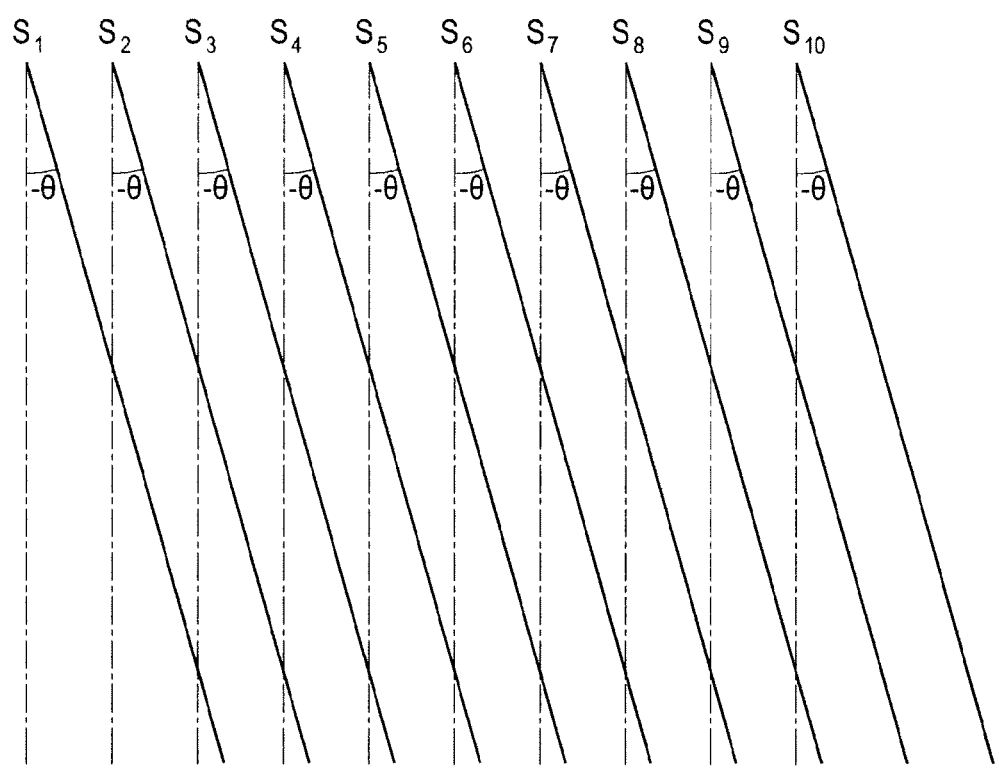
FIG. 2C is a schematic diagram showing a scan line group with its scan lines being steered at a predetermined steering angle ($-\theta$) with respect to a direction of a scan head of an ultrasound probe.

For example, three groups of scan lines may be set as illustrated in FIGS. 2A-2C. FIG. 2A is a schematic diagram showing a first scan line group with its scan lines not steered. FIG. 2B is a schematic diagram showing a second scan line group with its scan lines being steered at a predetermined steering angle ($\theta$) with respect to a direction of a scan head of an ultrasound probe. FIG. 2C is a schematic diagram showing a scan line group with its scan lines being steered at a predetermined steering angle ($-\theta$) with respect to a direction of a scan head of an ultrasound probe. Each of the scan line groups may consist of scan lines necessary for obtaining one frame. In one embodiment, the ultrasound beam may be controlled to be transmitted along the first to third scan line groups sequentially and alternately.

The elements of the ultrasound probe 112 may receive ultrasound echoes reflected from the target object and then output electrical receive signals. The ultrasound data acquisition unit 110 may further include a beam forming section 116, which may be operable to digitize the electrical receive signals to obtain digital signals. The beam forming section 116 may also apply delays to the digital signals in consideration of distances between the elements of the ultrasound probe 112 and focal points, and the steering angles of the scan lines. The beam forming section 116 may be further operable to sum the delayed digital signals to form receive-focused beams. In one embodiment, the beam forming section 116 may form a first receive-focused beam based on the ultrasound echoes reflected from the first scan line group. Also, the beam forming section 116 may form second and third receive-focused beams based on the ultrasound echoes corresponding to the second and third scan line groups, respectively.

The ultrasound data acquisition unit 110 may further include an ultrasound data forming section 118. The ultrasound data forming section 118 may be operable to form ultrasound data corresponding to a plurality of frames based on the receive-focused beams. In one embodiment, the ultrasound data forming section 118 may form first to third ultrasound frame data by using the first and third receive-focused beams, which are provided from the beam forming section 116. The ultrasound data may be radio frequency data, In-phase/Quadrature data or the like. Further, the ultrasound data acquisition unit 110 may be operable to perform upon the receive-focused beams a variety of signal processing such as gain adjustment, filtering and the like, which are necessary in forming the ultrasound frame data.

The ultrasound system 100 may further include an ultrasound image forming unit 120 that may be operable to form ultrasound images based on the ultrasound frame data, which are sequentially provided from the ultrasound data acquisition unit 110. In one embodiment, the ultrasound images may include at least one of elastic images, a brightness-mode (B-mode) image, etc. However, the ultrasound images may not be limited thereto.

In one embodiment, the ultrasound image forming unit 120 may include an elasticity information computing section (not shown) and an elastic image forming section (not shown). The elasticity information computing section may be operable to compute displacements between successive ultrasound frame data, which are obtained from an identical scan line group. In one embodiment, by way of non-limiting examples, the displacements may be computed by using auto-correlation or cross-correlation. The elasticity information computing section may form elasticity information based on the stress applied to the target object and the computed displacements.

Figure 3:
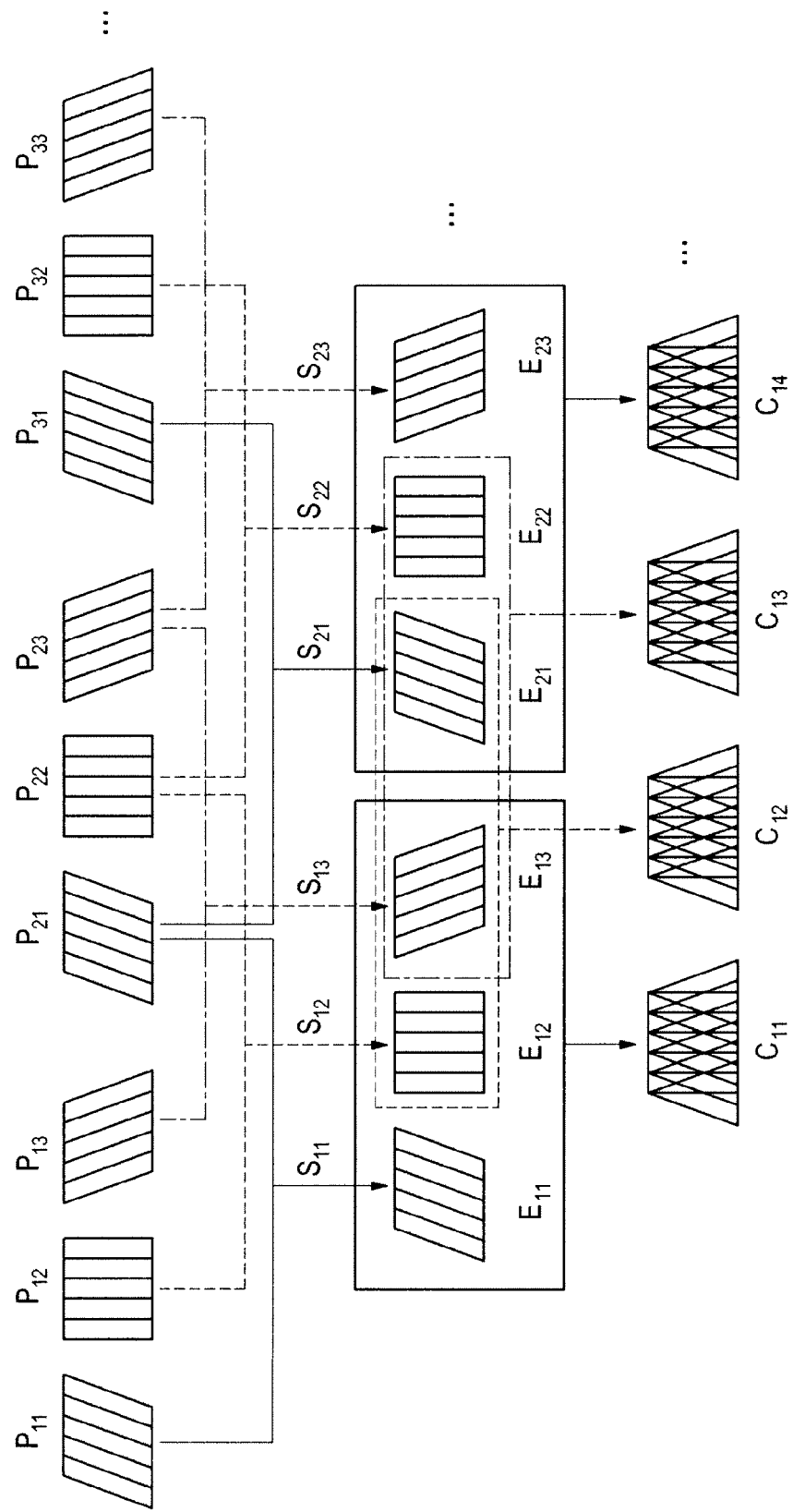
FIG. 3 is a schematic diagram showing an example of forming elastic images and compound images.
Figure 4:
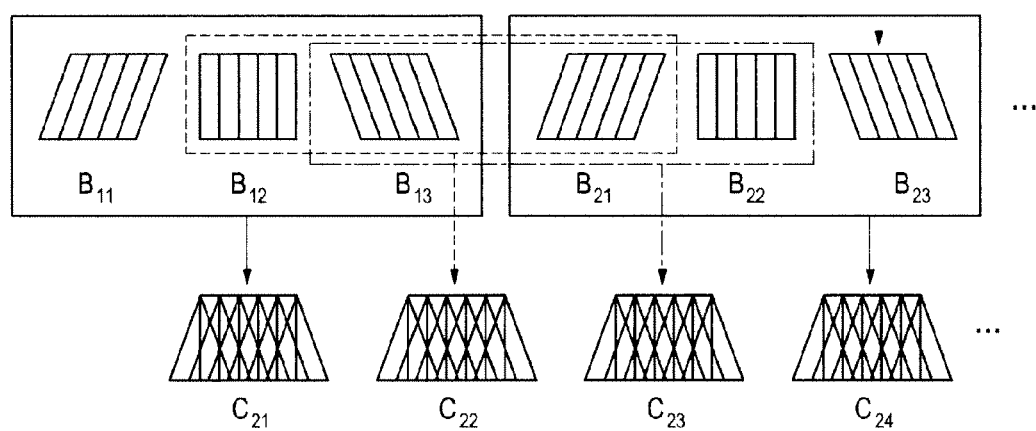
FIG. 4 is a schematic diagram showing an example of forming B-mode images and compound images.

As shown in FIG. 3, the elasticity information computing section may compute the displacements between successive frames for the identical steering angle of $\theta$ (e.g., $P_{11}$ and $P_{21}$, $P_{21}$ and $P_{31}$, etc.), and then compute elasticity information $S_{11}$, $S_{21}$, etc. based on the computed displacements. Also, the elasticity information computing section may compute the displacements between successive frames for the identical steering angle of 0 (e.g., $P_{12}$ and $P_{22}$, $P_{22}$ and $P_{32}$, etc.), and then compute elasticity information (e.g., $S_{12}$, $S_{22}$, etc.) based on the computed displacements. Further, the elasticity information computing section may compute the displacements between successive frames for the identical steering angle of $-\theta$ (e.g., $P_{13}$ and $P_{23}$, $P_{23}$ and $P_{33}$, etc.), and then compute elasticity information (e.g., $S_{13}$, $S_{23}$, etc.) based on the computed displacements. The elastic image forming section may be operable to form elastic images $E_{11}$, $E_{12}$, $E_{13}$, $E_{21}$, $E_{22}$, $E_{23}$ . . . by using the elasticity information $S_{11}$, $S_{12}$, $S_{13}$, $S_{21}$, $S_{22}$, $S_{23}$ . . . , which are provided from the elasticity information computing section, as shown in FIG. 3. In one embodiment, the ultrasound image forming unit 120 may further include a brightness-mode (B-mode) image forming section (not shown). The B-mode image forming section may be operable to form B-mode images $B_{11}$, $B_{12}$, $B_{13}$, $B_{21}$, $B_{22}$, $B_{23}$ . . . by using the ultrasound frame data provided from the ultrasound data acquisition unit 110, as shown in FIG. 4.

The ultrasound system 100 may further include a storage unit 130 to store the ultrasound data, the ultrasound images including the elastic images, the B-mode images and the like. In one embodiment, the storage unit 130 may include at least one of a flash memory, a hard disk, floppy disk, a magnetic tape, an optical disc, RAM, EEPROM and the like.

The ultrasound system 100 may further include a compound image forming unit 140. The compound image forming unit 140 may be operable to compound, for example, two or more ultrasound images, which are successively formed by different steering angles, to thereby form a compound image. The image compounding may be carried out by averaging pixel values, which are identically positioned at the respective ultrasound images, but the image compounding may not be limited thereto. In one embodiment, the compound image forming unit 140 may form the compound images in an interleaving way.

One embodiment of the compounding by the interleaving way will be described in detail. The compound image forming unit 140 may compound (i+1) ultrasound images, i.e., $m^{th}$ to $(m+i)^{th}$ ultrasound images, wherein m and i are positive integers. In this case, the ultrasound images may include elastic images, B-mode images and the like. Subsequently, the compound image forming unit 140 may compound ultrasound images determined by increasing m by 1. For example, assuming that three elastic images are compounded to form a compound image, the compound image forming unit 140 may compound elastic images $E_{11}$, $E_{12}$ and $E_{13}$, which may be formed based on frames acquired by different steering angles, i.e., $-\theta$, 0 and $\theta$, respectively, to thereby form a compound image $C_{11}$. Subsequently, the compound image forming unit 140 may compound elastic images $E_{12}$, $E_{13}$ and $E_{21}$, which are acquired by different steering angles of 0, $\theta$ and $-\theta$, to thereby form a compound image $C_{12}$. The above process of forming the compound images is performed repeatedly so that compound images $C_{13}$, $C_{14}$ . . . may be formed, as shown in FIG. 3. As described above, the previously acquired ultrasound images (e.g., two ultrasound images) are used to form the compound image through the interleaving way according to one embodiment. Thus, enhanced elastic images may be obtained without lowering a frame rate thereof.

In one embodiment, the compound image forming unit 140 may further compound the B-mode images, which are formed in the B-mode image forming section, to form compound images, as illustrated in FIG. 4. For example, the compound image forming unit 140 may compound B-mode images $B_{11}$, $B_{12}$ and $B_{13}$ to thereby form a compound image $C_{21}$. Subsequently, the compound image forming unit 140 may compound B-mode images $B_{12}$, $B_{13}$ and $B_{21}$, which have been acquired by different steering angles of 0, θ and −θ, to thereby form a compound image $C_{22}$. The compound image forming unit 140 may be operable to subsequently compound the B-mode images in the same manner as above so that compound images $C_{23}$, $C_{24}$ . . . may be formed, as shown in FIG. 4. As described above, the previously acquired B-mode images (e.g., two B-mode images) are used to form the compound image. Thus, an enhanced B-mode image may be obtained without lowering a frame rate.

The ultrasound system 100 may further include a control unit 140, which may be operable to control the operations of elements of the ultrasound system 100, such as the ultrasound data acquisition unit 110, the ultrasound image forming unit 120, the compound image forming unit 140 and the like. The control unit 150 may be coupled to a user interface (not shown) such as a keyboard, a mouse, a track ball, etc. to receive user instructions. The control unit 150 may be operable to enable the elements of the ultrasound system 100 to operate appropriately in response to user instructions.

In one embodiment, it is described that the ultrasound image forming unit 120, the compound image forming unit 140 and the control unit 150 are configured with separate elements in the ultrasound system 100. However, those may be embodied with a single processor such as a central processing unit, a microprocessor, a graphic processing unit, an application-specific integrated circuit and the like.

The ultrasound system may further include a display unit 160, which may be operable to display the ultrasound images, such as the elastic images, the B-mode images, the compound images and the like. In one embodiment, the display unit 160 may include at least one of a cathode ray tube (CRT) display, a liquid crystal display (LCD), an organic light emitting diode (OLED) display and the like.

In one embodiment, it has been described that the compound images are formed through the procedure of: computing displacements between neighboring frames, which have been acquired at the identical steering angle; computing elasticity information based on the displacements; forming elastic images based on the computed elasticity information; and compounding elastic images, which have been formed at different steering angles. In another embodiment, however, the elastic images may be formed by the following process: computing displacements between neighboring frames, which have been acquired at the identical steering angle; compounding displacements, which have been computed from frames acquired at different steering angles; computing elasticity information based on the compounded displacements; and forming elastic images based on the elasticity information.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An ultrasound system, comprising:
   an ultrasound data acquisition unit configured to transmit ultrasound beams to a target object along predetermined plural scan line groups of scan lines in an alternative and sequential manner by applying a pressure to the target object, receive ultrasound echoes reflected from the target object, and provide a plurality of ultrasound frame data, said predetermined plural scan line groups being respectively associated with predetermined steering angles and each of the plurality of ultrasound frame data being produced in response to the transmission of the ultrasound beam along the respective scan line groups; and
   a processor configured to compute elasticity information between neighboring frame data obtained at an identical steering angle based on the pressure based on the ultrasound frame data, form elastic images based on the elasticity information sequentially and compound $m^{th}$ to $(m+i)^{th}$ elastic images in an interleaving way to form compound images, wherein m is increased by 1 in forming a new compound image, and wherein m and i are positive integers.

2. The ultrasound system of claim 1, wherein the compounded ultrasound images are formed based on framed data obtained at different steering angles.

3. The ultrasound system of claim 2, wherein the compounded ultrasound images include an ultrasound image formed based on frame data obtained at a steering angle of 0.

4. The ultrasound system of claim 2, wherein the processor includes:
   a B-mode image forming section configured to form B-mode images corresponding to the respective steering angles based on the ultrasound data; and
   a compound image forming section configured to compound a predetermined number of B-mode images in an interleaving way to form the compound images.

5. A method of providing compound images in an ultrasound system, comprising:
   a) transmitting ultrasound beams to a target object along predetermined plural scan line groups of scan lines in an alternative and sequential manner by applying a pressure to the target object, and receiving ultrasound echoes reflected from the target object;
   b) providing a plurality of ultrasound frame data, said predetermined plural scan line groups being respectively associated with predetermined steering angles and each of the plurality of ultrasound frame data being produced in response to the transmission of the ultrasound beam along the respective scan line groups;
   c) computing elasticity information between neighboring frame data obtained at an identical steering amide based on the pressure based on the ultrasound frame data, and forming elastic images based on the elasticity information sequentially; and
   d) compounding $m^{th}$ to $(m+i)^{th}$ elastic images in an interleaving way to form compound images, wherein in is increased by 1 in forming a new compound image, and wherein m and i are positive integers.

6. The method of claim 5, wherein the compounded ultrasound images are formed based on framed data obtained at different steering angles.

7. The method of claim 6, wherein the compounded ultrasound images include an ultrasound image formed based on frame data obtained at a steering angle of 0.

* * * * *